(12) United States Patent
Schiel et al.

(10) Patent No.: US 7,219,094 B2
(45) Date of Patent: May 15, 2007

(54) METHOD AND SYSTEM FOR PROVIDING AN ADAPTIVE INTERFACE FOR USE IN INTERROGATING AN APPLICATION

(75) Inventors: James Allan Schiel, Sanatoga, PA (US); James Williams McInnis, West Chester, PA (US)

(73) Assignee: Siemens Medical Solutions Health Services Corporation, Malvern, PA (US)

( * ) Notice: Subject to any disclaimer, the term of this patent is extended or adjusted under 35 U.S.C. 154(b) by 571 days.

(21) Appl. No.: 10/109,156

(22) Filed: Mar. 28, 2002

(65) Prior Publication Data

US 2002/0169787 A1   Nov. 14, 2002

Related U.S. Application Data (60) Provisional application No. 60/290,137, filed on May 10, 2001.

(51) Int. Cl.
*G06F 17/30* (2006.01)

(52) U.S. Cl. .............................................. 707/4; 707/2

(58) Field of Classification Search .............. 707/1–10, 707/100–104.1; 709/202–205; 715/503
See application file for complete search history.

(56) References Cited

U.S. PATENT DOCUMENTS

| | | | |
|---|---|---|---|
| 5,903,889 A | 5/1999 | de la Huerga et al. .......... 707/3 |
| 6,119,126 A * | 9/2000 | Yee et al. ....................... 707/3 |
| 6,151,604 A | 11/2000 | Wlaschin et al. ........... 707/100 |
| 6,240,417 B1 * | 5/2001 | Eastwick et al. ............. 707/10 |
| 6,266,675 B1 | 7/2001 | Evans et al. ............. 707/104.1 |
| 6,565,609 B1 * | 5/2003 | Sorge et al. ................ 715/503 |
| 6,701,345 B1 * | 3/2004 | Carley et al. ............... 709/205 |
| 6,816,880 B1 * | 11/2004 | Strandberg et al. ......... 709/202 |

* cited by examiner

*Primary Examiner*—Jeffrey Gaffin
*Assistant Examiner*—Yicun Wu
(74) *Attorney, Agent, or Firm*—Alexander J. Burke (57) ABSTRACT

A method and a system to interface in order to interrogate a target application. The method and system includes an interface processor receiving data representing a query for information from a target application; a validation processor for validating whether the query representative data is suitable for initiating a search for information on the target application; a data formatting processor for formatting the query representative data into a format suitable for communication to the target application in response to the validation; and a communication processor for communicating the formatted query representative data to the target application.

20 Claims, 5 Drawing Sheets

METHOD AND SYSTEM FOR PROVIDING AN ADAPTIVE INTERFACE FOR USE IN INTERROGATING AN APPLICATION

This is a non-provisional application of a provisional application Ser. No. 60/290,137 by James McInnis, et al. filed May 10, 2001.

BACKGROUND OF THE INVENTION

1. Field of the Invention

The present invention relates to a method and system for providing an adaptive interface for use in interrogating an application. In particular, the present invention provides a method and a system for providing a Query/Response interface for querying information of a targeted application with a formatted query representative data.

2. Description of Related Art

It can be a very difficult process to build any interface from one application to another, even for those who have been doing so for many years. In particular building a Query/Response interface is all the more complex given the nature of the interface. In integration engineering, it is desirable to remove the barriers to interfacing and make intersystem connectivity a process that is easy to implement for anyone.

When building most interfaces (commonly called "store and forward"), the software engineer is faced with the complex task of formatting information into a specific structure, and then, at the right times (events) sending the data to another application for processing. The engineer faces the likewise difficult task of receiving similar information, decoding it, and determining how to process the data received. At the same time, all of this has to happen behind the scenes, without user intervention.

When building a query/response interface, the problems of the store and forward interface become commonplace. A store and forward interface has a specific list of events to handle. In query/response interfacing, an application user causes the event to occur by requesting that their application query another for information. At the same time, the user can change the parameters of the request by modifying the search criteria, the sort criteria, data selection criteria, and so on. The query/response mechanism has to know how to handle this situation and respond appropriately. At the same time, the query is coded, sent, and the corresponding response received and decoded all while the user is waiting—in other words, it has to happen very quickly.

To make matters worse, there are applications that cannot handle a query/response interface. These applications don't provide a query/response capability in their workflow and they often don't even provide the ability to interface data.

A working query/response interface is obtained on some existing systems though intensive work with an electronic data exchange product as well as work performed by consultants. These efforts, however, have been extensive and costly.

It therefore is desirable to provide a method and system which avoids the aforementioned drawbacks.

SUMMARY OF THE INVENTION

The present invention provides a method and a system providing an interface in order to interrogate a target application. The present invention includes an interface processor receiving data representing a query for information from a target application; a validation processor for validating whether the query representative data is suitable for initiating a search for information on the target application; a data formatting processor for formatting the query representative data into a format suitable for communication to the target application in response to the validation; and a communication processor for communicating the formatted query representative data to the target application.

BRIEF DESCRIPTION OF THE DRAWINGS

The invention will be described in more detail in the following description of preferred embodiments with reference to the following figures in which.

DETAILED DESCRIPTION OF THE PREFERRED EMBODIMENTS

Figure 1:
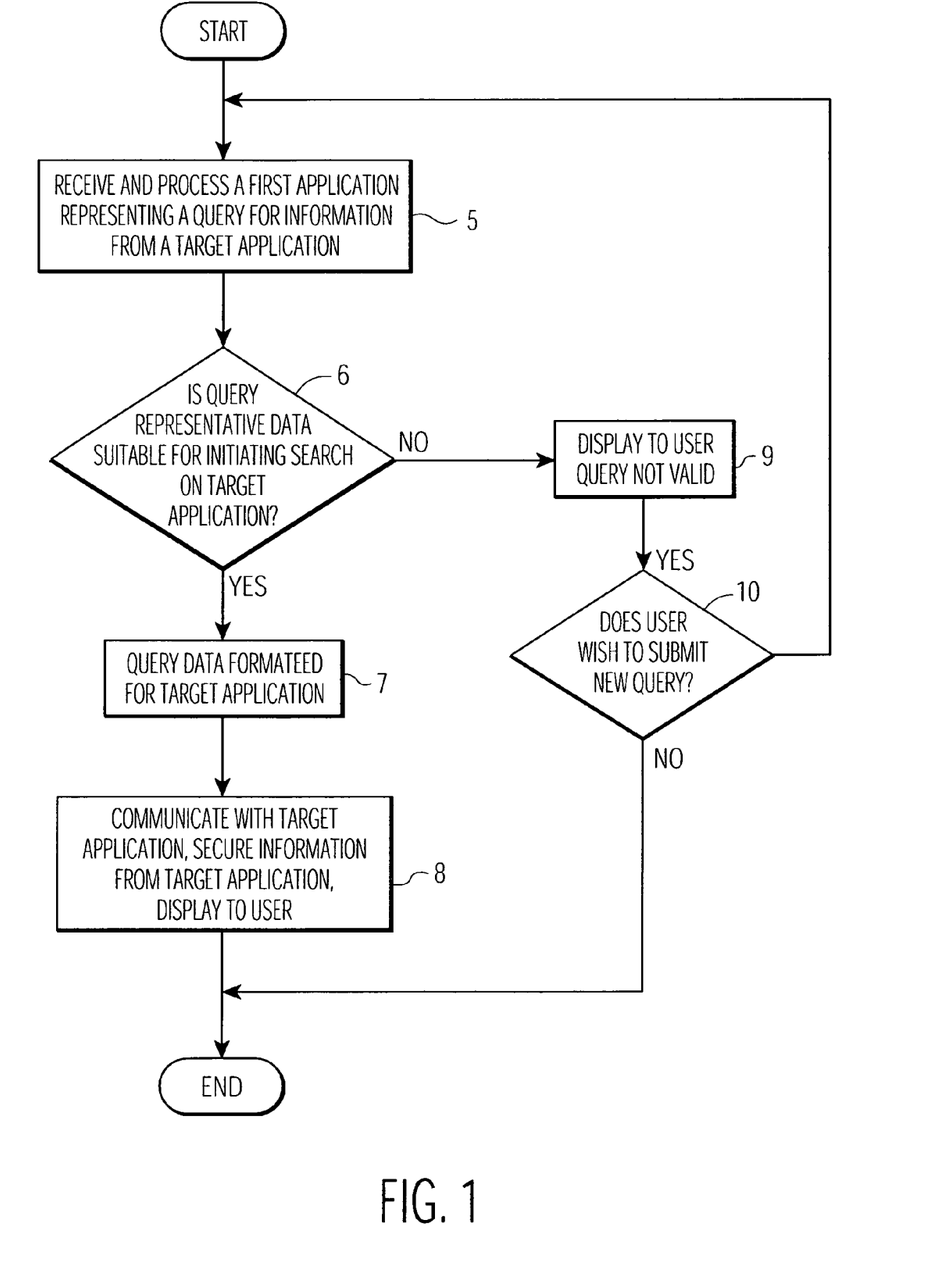
FIG. 1 is a general flow chart illustrating the method and system of the present invention.

Referring now to the drawings and in particular FIG. 1, FIG. 1 illustrates a general flow chart of a system according to a principle of the present invention. The present system provides for a virtual universal means of creating query/response interfaces in the client/server environment. The present system creates new software that communicates with various applications and executes on a user's workstation or from an application server preferably using standard Microsoft architected interfaces called the Component Object Model(COM). The software created by the present invention is built along a three-sectioned framework as illustrated in FIG. 1 of the drawings. The first part of the framework is the component that communicates with a specific application. As shown in FIG. 1 the present invention receives and processes the first application data that represents a query for information from a target data (step 5). Thus For example, this part of the method and system could operate with different applications using different protocols, e.g. a HLLAPI-based protocol (HLLAPI (High Level Language Application Program Interface) is an IBM API that allows a PC application to communicate with a mainframe computer. HLLAPI requires a PC to run 3270 emulation software and then defines an interface between a PC application and the emulation software. This API is also called screen-scraping because the approach uses characters that would otherwise be displayed on a terminal screen), while the same component written for another system might employ an MS-COM interface protocol. This step or component of the flow chart of FIG. 1 is responsible for collecting patient selection criteria from the application and returning the selected patient's information to the application.

The second part of the framework is the step or component that handles all of the business logic for query/response type interfaces. This portion of the software will remain fairly static, regardless of the applications being interfaced. This component is responsible for coordinating the actions of the application-specific components and also may communicate directly with the end-user if multiple patients match the selection criteria and a single patient must be selected.

In effect this portion (step 6) of the flow chart of FIG. 1 addresses the validation of the query data to determine if the query data has the sufficient amount of data to search the target application, e.g. does the query data contain the last name of patient? If the query data is not validated this message is displayed to the user in step 9. The user is then asked whether he wishes to submit a new query as shown in step 10.

The third part of the framework is the component or step (Steps 7 and 8 of FIG. 1) that communicates with the Master Patient Index application (the MPI application). The query data is first formatted for the target application (step 7 of FIG. 1). A communication processor then communicates with the target application in step 8 of FIG. 1. This step or component of the present invention is responsible for sending query commands to, and receiving the responses from, the MPI application.

The method and system of the present invention for a Common Query/Response interface makes two important things possible. First, all of the various switches and settings have been simplified for the user and turned into simple "yes" and "no"-type properties rather than involving a complex transaction set-up. Secondly, the Common Query/Response can support non-invasive means of extracting data from and implanting data into applications that are incapable of supporting a query/response interface.

The present invention eliminates the challenges of the query/response and add/revise interfaces to MPI applications. A unique application is created that can act as both a front-end utility for application software and a standalone client application for a user, all based on the same technology and packaged into a simple software application.

Figure 2:
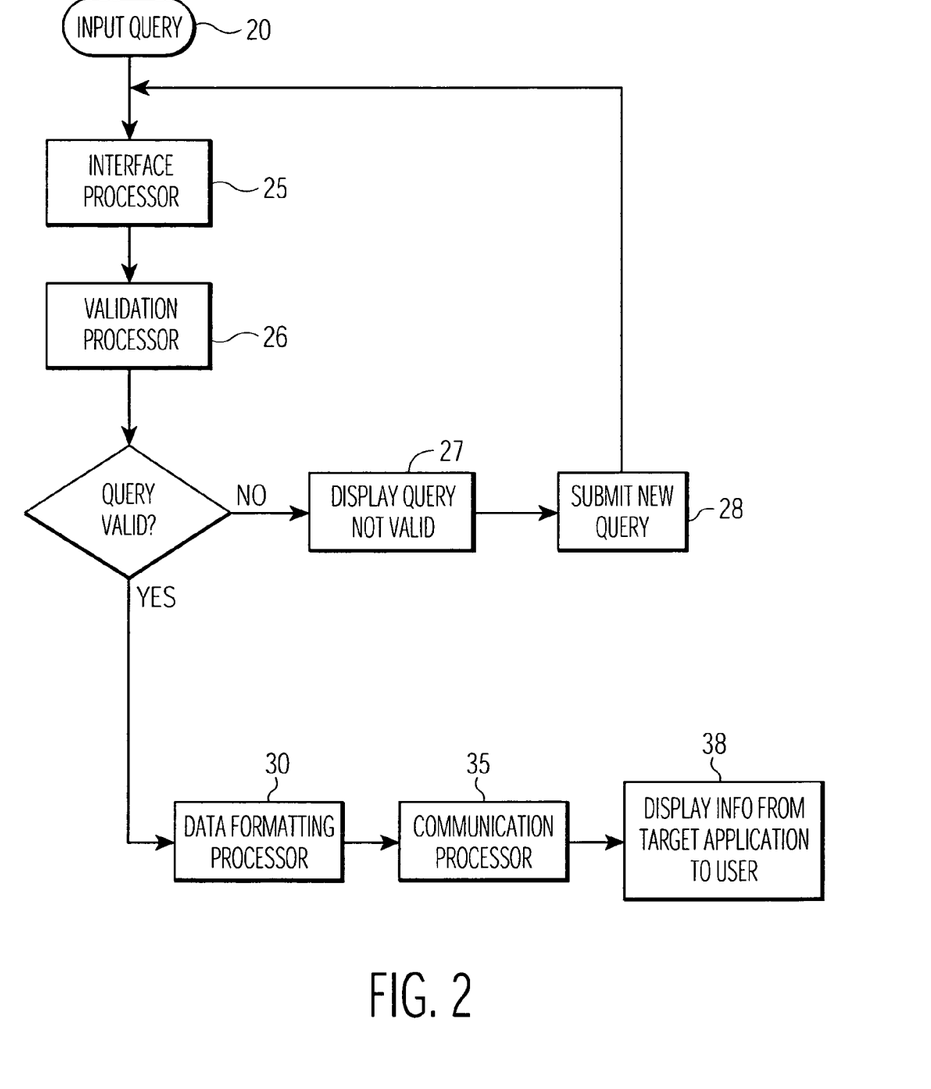
FIG. 2 is a general block diagram illustrating of the method and system of the present invention.

FIG. 2 is a block diagram of the present invention. As shown in FIG. 2, a user's query (20) is input to an interface processor (25). The interface processor (25) collects the query data and transmits it to a validation processor (26) which validates the data in order to ensure that the criteria provided can be used by the target application to perform a valid search for the target data. If the query (20) is not validated by the validation processor (26) then the user receives a display message (27) and can submit a new query (28) containing the proper criterion. If the data is validated by the validation processor (26) then the data is passed to the data formatting processor (30) to format the data before passing it to the communication processor (35) which communicates the formatted data query to the target application such as for example an MPI application. The target data is then searched for and displayed to the user (38).

Figure 3:
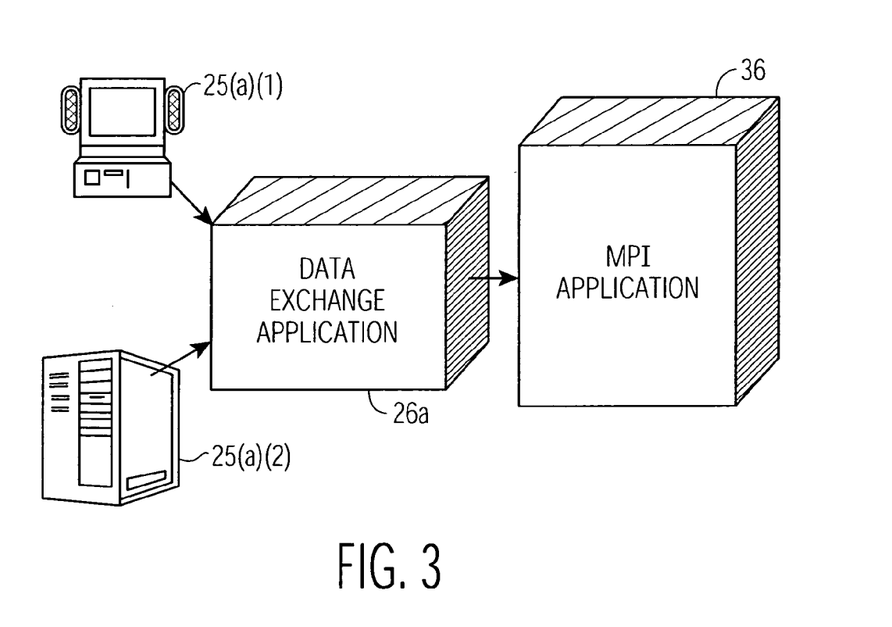
FIG. 3 is an embodiment of FIG. 2 of the present invention.
Figure 4:
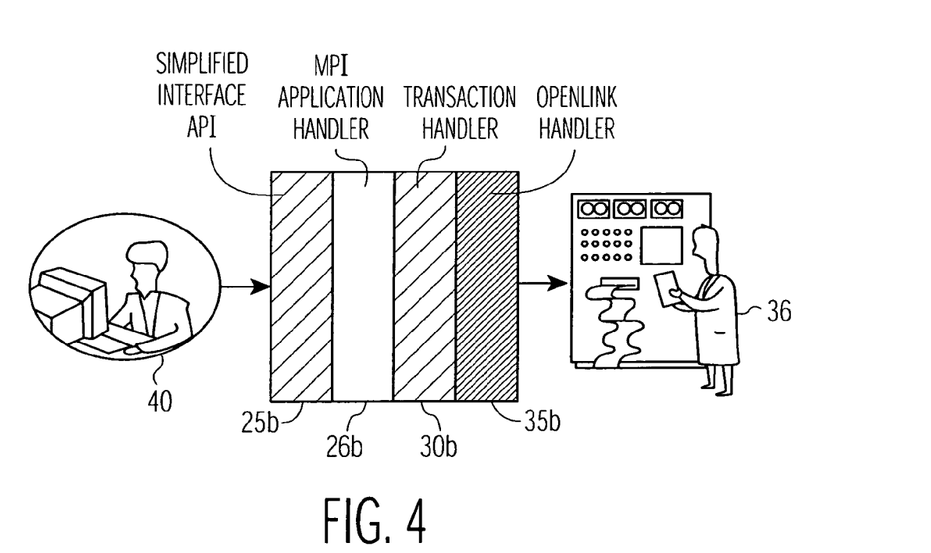
FIG. 4 is a first software embodiment for the block diagram of FIG. 3.
Figure 5:
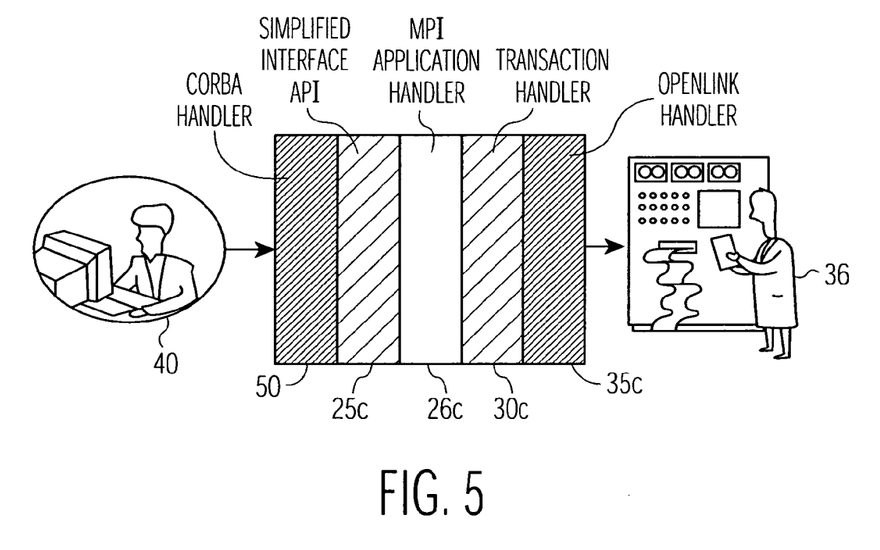
FIG. 5 is a second software embodiment for the block diagram of FIG. 3.

FIG. 2 illustrated the general block diagram of the present invention. FIGS. 3–5 illustrate various applications and embodiments of the block diagram of FIG. 2 and show some applications of the method and system of the present invention in bringing the interface to the end user. Corresponding element numbers are used to identify corresponding parts of the different embodiments.

FIG. 3 illustrates a first embodiment of the present invention in which a data query is input by an end user through either a client workstation (25(a)(1)) or an application server (25(a)(2)) requesting information from an MPI application (36) as the target application.

The present invention's Query/Response Interface communicates with an MPI applications using a data exchange application (26a). In order to reduce total effort and duplication, the Query/Response Interface makes use of the existing interface capabilities in the MPI products. An IDE stands for Interactive Data Exchange and is an interface mechanism which is used to create an interface that is interactive, e.g. an interface that communicate directly with a user and is usually part of the user's workflow. Thus for example an IDE interface is used for query/response and add/revise enrollee functions in exactly the same way that every other application communicates directly with an MPI application. At the highest level, the Query/Response Interface builds an interface to the MPI application as shown in FIG. 3.

As shown in FIG. 4 the Query/Response Interface is a multi-layered software utility that can be installed on the user's client workstation or on an application server. The way that the interface software is built allows it to respond to the user's specific requirements. FIG. 4 illustrates the basic architecture of the Query/Response Interface of the present invention.

The user (40), situated on the far left side of FIG. 4 wants to search for all persons whose last name is "Smith". She enters the information into the application she is using and the application then passes the provided information to the Simplified Interface API (25b). This part of the Query/Response Interface is an application programming interface (API); it provides an easy means by which a search can be started.

The interface API (25b) collects the user's data and passes it to the MPI Application Handler (26b) which is responsible for validating the data passed to it by the calling application. This is done to ensure that the criteria provided can be used by the MPI application to perform a valid search. This allows a fast response to the user if the search criteria is not completed. Once all validation is complete, the data is passed to the Transaction Handler (30b). At this point, the data provided by the user is formatted into a transaction format accepted by target MPI application (36).

Once a transaction has been built, it is passed to a data exchange engine (35b). The data exchange engine is responsible for sending the transaction on to the MPI application situated on the far right of FIG. 4. This part of the Query/Response Interface is responsible for sending the formatted transaction to the data exchange engine and then waiting for a response. When a response is received, the entire process repeats, but in reverse. The transaction received by the data exchange engine is given to the data exchange engine (35b) which, in turn, passes the transaction to the Transaction Handler (30b). At this point, the transaction is decoded into individual data elements and provided back to the calling application through the MPI Application Handler (26b) and the Simplified Interface API (25b).

The flexibility inherent in this embodiment of the present invention is in the ability to extend or modify the architecture to meet specific needs.

The embodiment in FIG. 5 shows how to achieve support for a new workstation application that cannot support the API provided by the present invention's Query/Response Interface by writing a new "handler" for the new workstation application. To illustrate, assume that the architecture shown in FIG. 5 is modified to support a new application that only supports CORBA-type calls. CORBA stands for Common Object Request Browser Architecture and is an open, vendor-independent architecture and infrastructure that computer applications use to work together over networks. Using a standard protocol, a CORBA—based program from any vendor, on almost any other computer, operating system, programming language, and network can inter-operate with the same or another vendor on almost any other computer, operating system, programming language and network. FIG. 5 illustrates the resulting architecture of this embodiment of the present invention.

Handlers, like the one shown in FIG. 5 will be written as needed as part of a model interface support or on an as-needed basis through professional services requests. The handler has two primary responsibilities:

First by taking native CORBA requests from the new application and then using the simplified interface API provided by the Query/Response Interface software to send the data to the MPI application.

Second by taking responses from the MPI application and reformatting them into CORBA format.

In some instances, the application may not support any basic interface capabilities. For these cases, the handler can take on much more responsibility than simple formatting, including screen scraping (for applications that are accessed via terminal emulation software). Handlers written to support screen scraping (HLLAPI), can also be smart enough to know when the user is on the right screen and automatically initiate interface functionality when appropriate.

As an example of a screen scraping function, an end-user is connected to an IBM mainframe system though a terminal emulator application running on a PC. The user navigates through the mainframe's application, arriving at a specific screen. A trigger is invoked (by user interaction such as a keystroke sequence, or by the interface application recognizing the correct screen is now displayed). Control is transferred to the interface application which reads the data from the terminal emulator display. The data is read from the display by coordinates (row/column/length) through "screen-scraping" accomplished through the HLLAPI API. Once data has been gathered, the interface then propagates the data through the various layers, sending the query on to the target system. The target system replies with the result data which is passed up through the interface layers. The HLLAPI API is then used by the interface program to write the response data to the terminal emulator display. Control is then returned to the end-user who then continues to navigate through the mainframe application. In this configuration, the IBM mainframe is unaware of the interface. The interface performs all of the data gathering, validation, formatting, and communication with the target system. The interface is seen as a live end-user entering data on the mainframe's display.

Any handler, once written, can be used again and again with other application, providing considerable cost and time savings for customers due to the high-degree of reusability provided by this structure.

Open DataBase Connectivity (ODBC) is a standard database access method developed by Microsoft Corporation. The goal of ODBC is to make it possible to access any data from any application, regardless of which database management system (DBMS) is handling the data. ODBC manages this by inserting a middle layer, called a database driver, between an application and the DBMS. The purpose of this layer is to translate the application's data queries into commands that the DBMS understands. For this to work, both the application and the DBMS should be ODBC-compliant—that is, the application is capable of issuing ODBC commands and the DBMS is capable of responding to them.

Text files are for applications that read and write their interfaced data to files.

In processing text files, data gathering may be performed by the querying system, for example. The querying system compiles relevant data, writing it out to a text file which is saved to a disk/directory to which the interface has access. A trigger event occurs (for example: a query text file is written to the disk) and the interface is activated. The interface program reads in the data from the text file, passing it through the various layers; validating, formatting, and communicating the query to the target system. The target system replies with the result data which is passed up through the interface layers. The interface program writes the reply data out to a text file which is saved to a disk/directory to which the querying system has access. A trigger event occurs (reply text file written to the disk) and the querying system processes the reply (by reading in the text file and resuming its program flow).

The present invention also provides support applications that do not support search and selection. In some cases, the application that is to be interfaced to the MPI application does not have any capability for the gathering of person selection criteria; displaying a list of persons that matched the entered criteria; providing for the selection of a specific person, and displaying the demographic information about the selected person.

For these instances, the Query/Response Interface software of the present invention provides built-in support to display a list of patients resulting from a query as well as displaying detailed patient information when the user selects a specific patient. These capabilities relieve the customer's application from having to provide any piece of the overall query/response workflow.

The Interface can be provided as a standalone application. The use of the Query/Response Interface as a standalone application is simply another instance of writing a specific handler for a new application of the present invention. In this case, however, the handler simply provides the final touches necessary to start the Query/Response Interface software and give the user a simple selection menu. As a standalone application, the Query/Response interface can provide quick and easy access to the MPI application without further effort. The standalone execution of this interface is not intended to answer any significant customer need, but rather, it provides the customer with a means to write their own application and to incorporate the Query/Response interface as an integral part of the customer's system.

Figure 6:
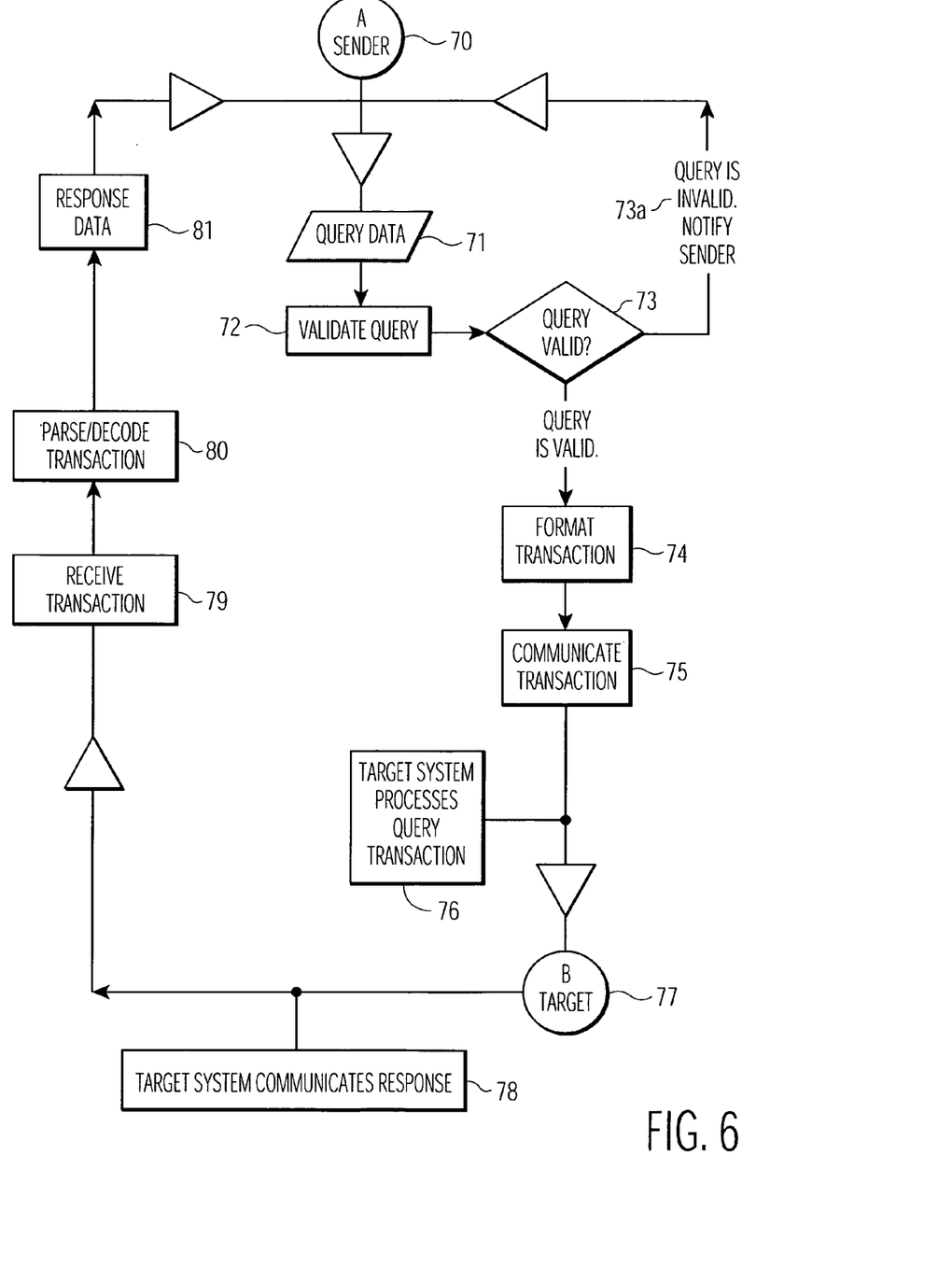
FIG. 6 is a detailed flow chart illustrating the operation of the present invention.

The flow chart of FIG. 6 of the drawings illustrates the operation of the present system as follows:

The Query Response Interface is called via a separate application that requires data from another system that supports query calls. In the specific example illustrated here for the present system, one system queries another system for a specific patient by name or patient number or all patients whose last name sounds like Smith, e.g. Smith, Smyth, Schmidt, etc. via a phonetic query. The present system is called by an application programmer interface—an API (step 70) and passes its information to query data (step 71) regarding the query in property fields. The application then waits for a response from the present system-the Query Response Interface. The response will be data from the system receiving the query via a response or an error message.

The query is then validated (step 72). The Query Response Interface is invoked via the API call and validates the passed property fields to insure it has at least the minimal required data to call the system to receive the query (System B—Target, step 77). The Query Response Interface validates that the calling application is passing one of the following: (a) patient name; (b) name; and (c) gender and phonetic key.

If the minimal data is not received then the Query Response Interface sends the error through Microsoft runtime error, with an error message. This routine will return the error to the calling application (step 73*a*).

Once the query has been validated (steps 72 and 73), the next step is the format application (step 74). The present system or query response interface pulls the information from the property fields and formats them (step 74) so that that application that receives the query (System B, step 77) can interpret the call. The format may differ to match the receiving systems requirements.

The present system communicates with the application receiving the query (System B) via an API call to a data exchange engine passing the formatted data via property fields. The data exchange engine has been confirmed to pass data through this specific API call onto the system to receive the query (System B, step 77). The present system waits passively for the data exchange engine to return the data or an error.

The query receiving system (System B,step 77) at this point processes the request and returns the requested data or an error.

In Step 79, the data exchange engine passes control back to the present system by placing data in the property fields and terminating its process. The present system regains control of the process.

Step 80 describes the parse/decode transaction. In this step, if an error is received from the query receiving application (system B) via the data exchange engine. The present system sends the error through a Microsoft runtime error, with an error an error number and message. This routine will return the error to the calling application (step 80).

If data is returned, the present system reformats the data to match the sending system's (System A) required format and places it in the appropriate property fields. The present system terminates and control is passed back to the sending system (System A).

In any case, the flexibility provided in this solution is in the ability to replace one component with another that provides the same functionality, but for a different application, MPI system, or protocol. This allows the present invention to change the make-up or "properties" of the interface without making substantial changes to any other part of the interface.

While certain embodiments have been shown and described, it is distinctly understood that the invention is not limited thereto but may be otherwise embodied within the scope of the appended claims.

What is claimed is:

1. A data processor implemented interface system supporting interrogation of a target application and an information repository via said target executable application, comprising:
    a first interface processor for receiving from a first executable application data representing a query for information from a target executable application of a plurality of different executable applications, said query representative data including query associated properties;
    a validation processor for validating whether said query representative data has a sufficient amount of data for initiating a search for information on a target executable application of a plurality of different executable applications;
    a data formatting processor for adaptively formatting said query representative data including query associated properties into an application specific format selected from a plurality of different predetermined formats associated with said plurality of different executable applications and suitable for accessing said target executable application in response to said validation; and
    a communication processor for bidirectionally communicating with said target executable application and communicating said formatted query representative data to said target executable application in a first data format different to a second data format of said query representative data received by said first interface processor from said first executable application.

2. An interface system according to claim 1, wherein said query for information comprises a request for information concerning at least one of, (a) a selected person, (b) a list of persons matching entered criteria, (c) identification of a specific person, (d) personal characteristics of a specific person and (e) medical information of a specific person.

3. An interface system according to claim 1, wherein said system supports interrogation of a medical information repository via said target executable application, and
said query for information comprises a request for information concerning at least one of, (a) a selected patient, (b) a list of patients matching entered criteria, (c) identification of a specific patient, (d) personal characteristics of a specific patient and (e) medical information of a specific patient.

4. An interface system according to claim 1, wherein upon unsuccessful validation, said validation processor initiates generation of a message to a user indicating failure of said validation.

5. An interface system according to claim 1, wherein said first interface processor comprises a Microsoft compatible Application Programming Interface (API).

6. An interface system according to claim 1, wherein said communication processor receives a response message from said target executable application in a first data format and provides said response message to said data formatting processor for parsing and decoding into data elements in a different second data format to be provided to said first executable application via said first interface processor.

7. An interface system according to claim 6, wherein said validation processor validates said data elements are compatible with said first executable application prior to providing said data elements to said first executable application via said first interface processor.

8. An interface system according to claim 1, including an application specific interface for receiving and converting application specific data representing a query for information from said first executable application and providing said converted query representative data to said first interface processor for further processing.

9. An interface system according to claim 8, wherein said application specific interface is customizable for different application types.

10. An interface system according to claim 8, wherein said application specific interface receives and converts response data from said first interface processor to a format compatible with said specific application and communicates said converted response data to said first executable application.

11. An interface system according to claim 8, wherein said application specific interface converts application specific data representing a query for information from said first executable application using at least one of, (a) a terminal data interception technique, (b) text file processing and (c) ODBC support.

12. An interface system according to claim 1, wherein said interface system adaptively creates a common query/response interface suitable for interrogating a user specified target application by a user-specified querying application with formatted query representative data, wherein said user-specified target application is (a) incapable of supporting a query/response interface or (b) cannot communicate with said querying application using an associated query/response interface.

13. An interface system according to claim 12, wherein said common query/response interface supports a non-invasive means of extracting data from and implanting data into target applications that are incapable of supporting a query/response interface.

14. An interface system according to claim 12, wherein said common query/response interface supports screen scraping.

15. A computer implemented interface system supporting interrogation of a target application, comprising:
a first interface processor for bidirectionally communicating with a first application for receiving data in a first data format from said first application representing a query for information from a target application and for communicating corresponding response data elements to said first application in said first data format;
a validation processor for validating whether said query representative data has a sufficient amount of data for initiating a search for information on a target application of a plurality of different applications;
a data formatting processor for adaptively formatting said query representative data into an application specific format different to said first format and selected from a plurality of different predetermined formats associated with said plurality of different applications and suitable for communication to said target application in response to said validation and for parsing and decoding a received corresponding response message in an application specific format from said target application into data elements and formatting said data elements into said first format to be provided to said first application via said first interface processor, said plurality of different applications including a non-database management application; and
a communication processor for communicating said formatted query representative data in an application specific format to said target application and for providing said received corresponding response message in an application specific format from said target application to said formatting processor.

16. An interface system according to claim 15, wherein said query representative data includes query associated properties and
said data formatting processor formats said query associated properties into an application specific format selected from a plurality of different predetermined formats associated with said plurality of different applications and
said validation processor validates said data elements are compatible with said first application prior to providing said data elements to said first application via said first interface processor.

17. A data processor implemented interfacing method supporting interrogation of a target application and an information repository via said target executable application, comprising the activities of:

receiving from a first executable application data representing a query for information from a target executable application of a plurality of different executable applications, said query representative data including query associated properties;
validating whether said query representative data has a sufficient amount of data for initiating a search for information on a target executable application of a plurality of different executable applications;
adaptively formatting said query representative data including query associated properties into an application specific format selected from a plurality of different predetermined formats associated with said plurality of different executable applications and suitable for accessing said target executable application in response to said validation; and
bidirectionally communicating with said target executable application and communicating said formatted query representative data to said target executable application in a first data format different to a second data format of said query representative data received from said first executable application.

18. A method according to claim 17, wherein
said query for information comprises a request for information concerning at least one of, (a) a selected patient, (b) a list of patients matching entered criteria, (c) identification of a specific patient, (d) personal characteristics of a specific patient and (e) medical information of a specific patient.

19. A data processor implemented interfacing method supporting interrogation of a target application, comprising the steps of:
receiving data from a first application representing a query for information from a target application of a plurality of different executable applications, said query representative data including query associated properties;
validating whether said query representative data has a sufficient amount of data for initiating a search for information on a target application of a plurality of different executable applications;
adaptively formatting said query representative data into an application specific format selected from a plurality of different predetermined formats associated with said plurality of different applications and suitable for communication to said target application in response to said validation, said plurality of different executable applications including a non-database management application;
communicating said formatted query representative data in an application specific format to said target application;
parsing and decoding a response message in an application specific format from said target application into data elements; and
communicating said data elements to said first application.

20. A computer implemented common query interface system supporting interrogation of a target application incapable of supporting a query/response interface, comprising:
a first interface processor for receiving from a first executable application data representing a query for information from a target executable application of a plurality of different executable applications, said query representative data including query associated properties;

a validation processor for validating whether said query representative data is suitable for initiating a search for information on a target executable application of a plurality of different executable applications;

a data formatting processor for adaptively formatting said query representative data including query associated properties into an application specific format selected from a plurality of different predetermined formats associated with said plurality of different executable applications and suitable for accessing said target executable application in response to said validation, said plurality of different executable applications including a non-database management application; and a communication processor for communicating said formatted query representative data to said target executable application in a first data format different to a second data format of said query representative data received by said first interface processor from said first executable application.

* * * * *